United States Patent [19]

Holman

[11] Patent Number: 4,668,384

[45] Date of Patent: May 26, 1987

[54] WASHING UNIT FOR CARTRIDGE FILTERS AND METHOD THEREFOR

[76] Inventor: Paul D. Holman, 919 E. Kaler Dr., Phoenix, Ariz. 85020

[21] Appl. No.: 730,769

[22] Filed: May 3, 1985

Related U.S. Application Data

[63] Continuation of Ser. No. 462,519, Jan. 31, 1983, abandoned.

[51] Int. Cl.$^4$ ............................................. B01D 23/24
[52] U.S. Cl. ...................................... 210/797; 134/34; 134/137; 134/138; 210/106; 210/249; 210/282; 210/772
[58] Field of Search .............. 210/249, 282, 407, 411, 210/772, 275, 797, 741, 106; 134/138, 198, 199, 137, 34, 143

[56] References Cited

U.S. PATENT DOCUMENTS

| | | | |
|---|---|---|---|
| 2,616,820 | 11/1952 | Bourgeaux | 134/34 |
| 2,985,178 | 3/1961 | Christensen, Jr. | 134/199 |
| 3,180,759 | 4/1965 | Falk | 134/38 |
| 3,421,527 | 1/1969 | Dettman | 134/138 |
| 3,428,060 | 2/1969 | Spivey | 134/138 |
| 3,650,283 | 3/1972 | Lang | 134/143 |
| 3,731,697 | 5/1973 | Yost et al. | 134/138 |
| 3,820,552 | 6/1974 | Lang et al. | 134/113 |

*Primary Examiner*—Michael S. Marcus
*Attorney, Agent, or Firm*—Cahill, Sutton & Thomas

[57] ABSTRACT

A washing unit has a receptacle for receiving at least one half of the length of a cylindrical cartridge filter for swimming pool filtration systems. An orifice, disposed in the side of the receptacle, directs water against at least the lower half of the external cylindrical surface of the filter to wash off and entrain foreign matter collected thereon upon flow of the water intermediate the filter and the receptacle. A discharge outlet downstream of the filter discharges the water and entrained foreign matter. An upwardly extending mouth at the inlet of the receptacle accommodates manual insertion, withdrawal and manipulation of the filter during washing while containing water splash. A pair of legs extending from proximate the inlet maintain the receptacle inclined to encourage downward water flow along the filter from the orifice to the discharge outlet.

4 Claims, 3 Drawing Figures

U.S. Patent  May 26, 1987  4,668,384
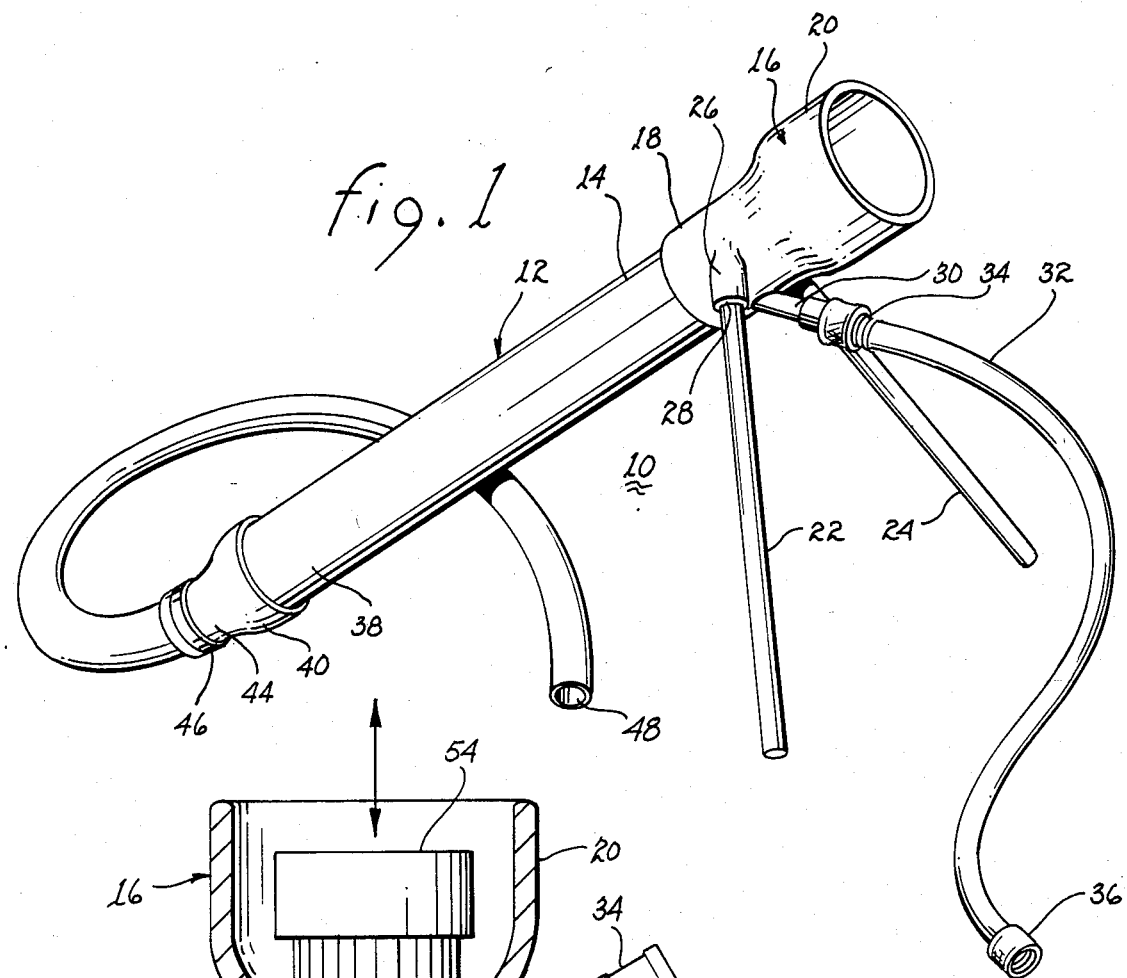
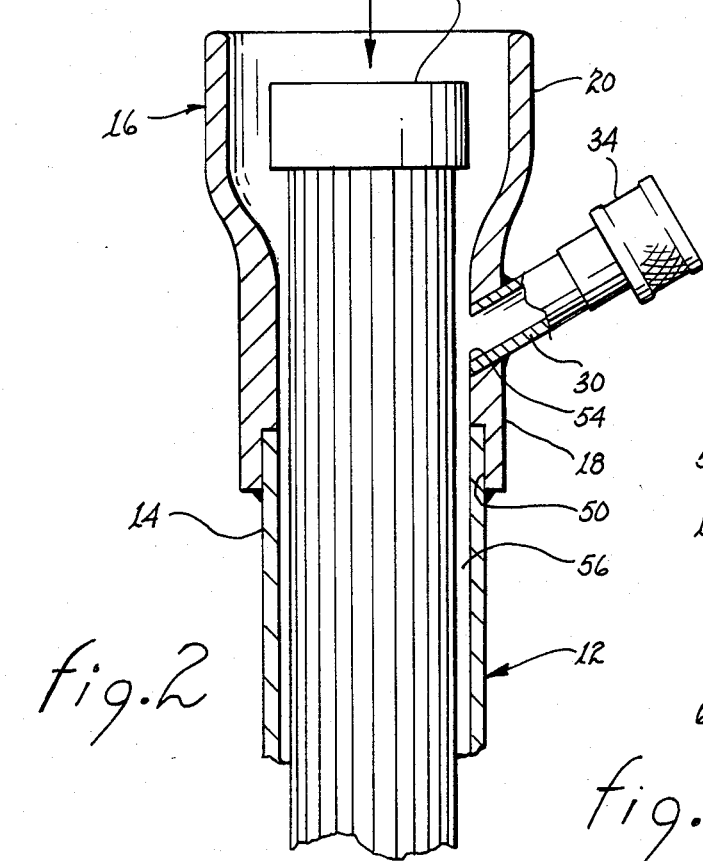
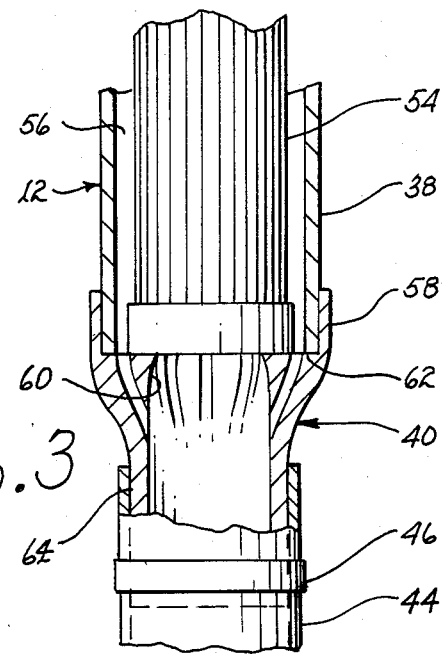

WASHING UNIT FOR CARTRIDGE FILTERS AND METHOD THEREFOR

This is a continuation of application, Ser. No. 462,519, filed Jan. 31, 1983, abandoned.

The present invention relates to washing apparatus and, more particularly, to apparatus for washing cylindrical filters.

Most swimming pools include a water filtration system for intermittently or continuously filtering the water. The filters employed in such filtration systems are of hollow cylindrical construction with a filtering membrane being convoluted and defining the inner and outer perimeters of the cylinder. Generally, the water to be filtered is either pumped or drawn from the external surface to the internal surface of the filtering membrane. The particulate matter to be filtered becomes lodged upon the external surface of the cylindrical filter and in due course will begin to inhibit water flow through the filter. For continued operation, the filter must be replaced or the particulate matter collected upon its external surface must be cleaned.

Various filter cleaning devices have been developed. U.S. Pat. No 3,820,552 describes a cleaner for cartridge filters, which cleaner includes two concentric cylinders defining an annular space therebetween. Water flow under pressure is introduced into the annular space and discharged therefrom through apertures at the lower end of the interior cylinder. The interior cylinder is dimensioned to envelope a cartridge filter mounted within the tank of a pool filtration system. By reciprocating the cleaner, the water discharged from the inner cylinder will strike the external surface of the cartridge to dislodge debris therefrom and effect cleaning. The debris entrained water drains from the lower end of the cleaner downwardly along the external surface of the cartridge to the bottom of the tank. U.S. Pat. No. 2,211,892 is directed to apparatus for cleaning a cylindrical filter having a closed end formed of the filtering material itself. The cleaning apparatus is a cylindrical body having a discharge nozzle in fluid communication with the hollow interior of the filter. Water is introduced into a compartment around the filter and, under pressure, is forced to flow through the filter into the hollow interior and therefrom discharged through the discharge nozzle. U.S. Pat. No. 3,665,547 is directed to a cleaning apparatus for a stack of cylindrical air filters and the like; air under pressure is introduced to the internal cavity of the filters and forced through the filters to evacuate particulate matter from the filtering membranes. U.S. Pat. Nos. 3,642,013 and 3,650,283 describe apparatus employing a plurality of nozzles located within a closed filter containing compartment to direct a spray of cleaning fluid against the external surface of the contained filter or filters. U.S. Pat. No. 4,172,373 is directed to apparatus for washing paint rollers vertically mounted upon a hollow cylindrical tube. A cleaning fluid, such as water, is forced up through the tube, the internal cylindrical cavity of the paint roller and thereafter permitted to cascade down the outer nap of the paint roller to effect a washing action. U.S. Pat. No. 3,635,143 is directed to a washer for washing film negatives mounted upon a spiral holder. A plurality of nozzles direct spray in general alignment with the mounted film to effect a washing action.

Particularly for domestic use, any apparatus for cleaning or reconditioning the cylindrical cartridge filters used in pool filtration systems must be relatively inexpensive and easy to use. To satisfy these criteria and also be effective, the present invention is a sleeve like receptacle having an internal dimension sufficient to loosely receive a cartridge filter placed therein. An orifice disposed in the side of the receptacle and connectable to a garden hose or the like through a threaded stud introduces the washing fluid, water, to the receptacle. A discharge outlet is located at the bottom of the receptacle to discharge all water, contaminates and other particulate matter dislodged from the external surface of the cartridge filter. Conveying means, such as a collapsible plastic tube or the like may be attached to the discharge outlet to direct the water into a drain, a lawn, a flower bed, or other predetermined location. To maintain flow through the receptacle, the inlet to the receptacle is positioned above the outlet by legs or the like to elevate the inlet end of the receptacle. A wide mouth may be attached to the inlet to guide the cartridge filter into the receptacle, serve as a splash guard and permit manual insertion, removal, reciprocation and rotation of the cartridge filter. In concert with the expected manual handling of the filter and for purposes of reducing both the size and cost of the apparatus, the receptacle may be made just long enough to permit insertion of somewhat more than one half of the filter length between the orifice and the discharge outlet. To effect complete washing of the filter, first one end of the filter is inserted into the receptacle and washed and then the other end is inserted and washed; during such washing, the cartridge filter may be manually, reciprocated and rotated.

It is therefore a primary object of the present invention to provide a cleaning apparatus for a cylindrical cartridge filter.

Another object of the present invention is to provide apparatus for washing one half of a cartridge filter at a time.

Still another object of the present invention is to provide a transportable free-standing apparatus for washing cartridge filters.

Yet another object of the present invention is to provide apparatus for receiving a cartridge filter and permitting manipulation of the cartridge filter during washing.

A further object of the present invention is to provide apparatus having opposed open ends for washing cartridge filters inserted therein.

A still further object of the present invention is to provide an inexpensive washing apparatus for swimming pool cartridge filters.

A yet further object of the present invention is to provide apparatus for washing the surface of a hand-holdable device insertable within a receptacle and having a washing fluid flowing therethrough.

These and other objects of the present invention will become apparent to those skilled in the art as the description thereof proceeds.

The present invention will be described with greater specificity and clarity with reference to the following drawings, in which:

FIG. 1 is a perspective view of the washing unit;

FIG. 2 is a partial cross-sectional view illustrating location of the cartridge filter within the washing unit; and FIG. 3 is a partial cross-sectional view illustrating the water discharge end of the washing unit.

Referring to FIG. 1, there is shown a washing unit 10 for cleaning cylindrical cartridge filters of the type often used in conjunction with swimming pool filtration systems. A body or receptacle 12 is a hollow cylinder having an internal diameter larger than that of the cartridge filter to be cleaned to permit flow of water and particulate matter through the annular space between the receptacle and the cartridge filter. The upper end of the inlet is raised to provide a downward flow of water through the receptacle in response to the force of gravity. A mouth 16 is attached to and extends from the upper end of the receptacle 12. The mouth serves as an inlet to the receptacle and may serve several other functions, including guiding the cartridge filter into the receptacle, as a guard to contain splash of washing fluid and encouraging flow of splashed washing fluid back into the receptacle. Moreover, it is of a diameter sufficiently large to permit manual grasping and holding therein of an end of the cartridge filter during cleaning of same.

In the embodiment shown, mouth 16 may be formed as a collar having a constricted section 18 for sealingly engaging the peripheral surface of the upper end of receptacle 12 and a diametrically enlarged section 20 for accommodating manual gripping of the cartridge filter end during cleaning.

The upper end of receptacle 12 is maintained elevated by legs 22, 24 extending therefrom. To promote manufacturing and assembly economies an embossment 26 may be formed on such side of constricted section 18 to receive within a cavity 28 formed therein one end of a leg.

A hollow stud 30 extends from the bottom side of constricted section 18 for the purpose of introducing the washing fluid into receptacle 12. It is to be understood that the stud may, alternatively, extend directly from receptacle 12 or extend from a different location. A conventional garden hose 32 may be connected to stud 30 by a conventional coupling 34. End 36 of the garden hose is connectable to an available source of washing fluid, such as a house water tap. Hereinafter, water will be recited as the washing fluid.

Lower end 38 of receptacle 12 serves the function of evacuating the cleaning fluid and as a third point of support for the inclined receptacle. A hollow fitting 40 is attached to and circumscribes the lower end and serves as a transition element to direct water into conveying means, such as a hose or a flexible tubing 42. The flexible tubing may be attached to the necked down section 44 of fitting 40 by means of a hose clamp 46 or the like. Outlet 48 of the flexible tubing may be located proximate a drain, on a lawn, in a flower bed or wherever else it is desired that the discharged water flow.

Referring specifically to FIG. 2, further details of upper end 14 and mouth 16 will be described. Receptacle 12 may be a length of conventional plastic tubing of suitable diameter to loosely receive the cartridge filter. Mouth 16 includes an internal annular recess 50 for receiving the upper edge of receptacle 12; attachment therebetween may be by means of an adhesive, through a friction fit or other means well known to those skilled in the art. Hollow stud 30 includes an orifice 52 for directing water into the receptacle and against the exterior surface, i.e., the filter membrane, of cartridge filter 54 (shown in phantom lines). While the orifice is shown as directing the inflowing water at an angle with respect to the longitudinal axis of the receptacle, it is to be understood that the water may be directed along a radial to the longitudinal axis of the receptacle. An annular space 56 of sufficient cross-sectional area exists between cartridge filter 54 and the interior surface of receptacle 12 to provide sufficient flow rate of the water therethrough to create an adequate force to dislodge debris and particulate matter encrusted upon the external surface of the cartridge filter. Moreover, the annular space is maintained of sufficient width to provide relatively turbulent flow, and possibly cavitation, which turbulence and cavitation aids in dislodgement of the debris and particulate matter.

Enlarged section 20 of mouth 16 extends radially from cartridge filter 54 a sufficient amount to allow a user to hold onto the cartridge filter during washing. The length of the enlarged section upstream of orifice 52 is preferably sufficient to contain any upstream water flow or splashing from orifice 52.

Referring specifically to FIG. 3, lower end 38 of the receptacle will be described. Fitting 40 includes an upper end 58 for circumscribingly receiving end 38 of receptacle 12. An annular shoulder 60 may be formed internally to serve two purposes. First, it serves as a shoulder against which edge 62 of the receptacle bears and it serves as a pedestal upon which cartridge filter 54 rests.

It is to be understood that annular shoulder 60, with respect to its function as a pedestal for the cartridge filter, may not be continuous as then it would impede flow of water from annular space 56 into fitting 40. Accordingly, the portion of the annular shoulder serving as a pedestal is preferably of ribbed configuration with the exposed space between the ribs being commensurate in area with the cross-sectional area of annular space 56. Other means, whether incorporated in receptacle 12 or fitting 40 and operating in conjunction with mouth 14 for maintaining cartridge filter 54 manually accessible may be employed.

Lower end 64 of fitting 40 may be necked as shown to circumscribingly receive the end of flexible tubing 44 maintained in place by hose clamp 46.

In operation, a cartridge filter to be washed is manually inserted through mouth 16 into receptacle 12. A flow of water through orifice 52 may be established before or after the cartridge filter is inserted. Upon insertion, the cartridge filter is preferably manually reciprocated along and rotated about its longitudinal axis to subject as much as possible of its external surface to the washing and scrubbing action of the water flow from the orifice. During this step, the upper end of the cartridge filter is not or is only minimally subjected to a washing action. To effect complete washing of the cartridge filter, it is withdrawn, turned around and reinserted and the other end is gripped during subsequent washing and scrubbing.

The length of receptacle 12, in combination with mouth 16 is preferably maintained as short as possible to minimize storage requirements and handling difficulties for the user. In one embodiment, the distance between the orifice and the lower most point to which the cartridge filter can be inserted, in example the maintaining means or pedestal formed by annular shoulder 60, is at least one half of the length of the cartridge filter to be washed. Should the angular orientation of the stud be changed to provide a washing action upstream of the orifice in the receptacle, the length of the washing unit as a whole may be decreased to a length equivalent to about one half of the length of the cartridge filter. Thereby, each half of the cartridge filter can be washed at a time.

Elements other than cartridge filters can also be washed in a device the same as or like invention described and thereby benefit from the continuous controlled constricted flow of washing fluid augmented by manual agitation of the element.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A method for washing cylindrical cartridge filters, said method comprising the steps of:
   (a) providing a cylindrically walled receptacle having an inner surface, an upper end which facilitates the insertion and removal of a cylindrical cartridge filter a lower end with support means for supporting an insertable cylindrical cartridge filter and an orifice in the receptacle for introducing washing fluid;
   (b) inserting a cylindrical cartridge filter, having an outer cylindrical surface, through the upper end of the receptacle and into the receptacle;
   (c) supporting the cylindrical cartridge filter proximate the lower end of the receptacle to position at least a lower half of the supported cylindrical cartridge filter within the receptacle;
   (d) providing a cylindrically configured annular free space between the inner surface of the receptacle and the outer cylindrical surface of the cylindrical cartridge filter upon insertion of the cylindrical cartridge filter in the receptacle;
   (e) introducing a stream of washing fluid under pressure through the orifice located in the cylindrical wall of the receptacle to impinge upon the outer cylindrical surface of the cylindrical cartridge filter in the receptacle whereby the annular space receives the stream of washing fluid upon exercise of said introducing step and channels the washing fluid circumferentially about the outer cylindrical surface of the cylindrical cartridge filter which was inserted within the receptacle;
   (f) passing at least a portion of the washing fluid through a cylindrical wall of the cylindrical cartridge filter
   (g) continuously discharging the washing fluid, which has contacted the cylindrical cartridge filter, from the lower end of the receptacle at a point downstream of the cylindrical cartridge filter; and
   (h) withdrawing the cylindrical cartridge filter through the upper end of the receptacle after the cylindrical cartridge filter has been washed.

2. The method as set forth in claim 1 including the step of maintaining an upper portion of the cylindrical cartridge filter exterior to the upper end of the receptacle to facilitate removal of the cylindrical cartridge filter therefrom.

3. The method as set forth in claim 1 including the step of maintaining the upper end of the receptacle open during exercise of said discharging step.

4. The method as set forth in claim 3 further including the step of directing the washing fluid in the direction of the lower end of the receptacle.

* * * * *